United States Patent
Bleau et al.

(10) Patent No.: US 6,502,886 B1
(45) Date of Patent: Jan. 7, 2003

(54) DEVICE FOR TRANSPORTING OBJECTS IN A MOTOR VEHICLE

(75) Inventors: John Bleau, Plymouth, MI (US); Tamas Karacsonyi, Wuppertal (DE); Mike Dearman, Cologne (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/719,059

(22) PCT Filed: Jun. 1, 1999

(86) PCT No.: PCT/EP99/03791

§ 371 (c)(1),
(2), (4) Date: Feb. 5, 2001

(87) PCT Pub. No.: WO99/64271

PCT Pub. Date: Dec. 16, 1999

(30) Foreign Application Priority Data

Jun. 9, 1998 (DE) ..................................... 298 10 334 U

(51) Int. Cl.⁷ ................................................. B60R 5/04
(52) U.S. Cl. .................. 296/37.3; 296/37.2; 296/37.14; 296/37.16; 224/42.13; 224/42.14
(58) Field of Search ........................... 296/37.14, 37.16, 296/37.2, 37.3, 37.8, 39.1; 224/42.13, 42.14

(56) References Cited

U.S. PATENT DOCUMENTS

| | | | | |
|---|---|---|---|---|
| 5,167,433 A | * | 12/1992 | Ryan | 220/533 |
| 5,669,537 A | * | 9/1997 | Saleem et al. | 224/42.32 |
| 5,799,845 A | * | 9/1998 | Matsushita | 224/42.14 |
| 6,247,741 B1 | * | 6/2001 | Seel et al. | 296/37.14 |
| 6,290,277 B1 | * | 9/2001 | Spykerman et al. | 224/496 |

FOREIGN PATENT DOCUMENTS

| | | | | |
|---|---|---|---|---|
| DE | 19641386 A1 | * | 7/1997 | B62D/43/10 |
| DE | 19854365 A1 | * | 6/2000 | B60N/5/00 |

* cited by examiner

Primary Examiner—D. Glenn Dayoan
Assistant Examiner—Patricia Engle
(74) Attorney, Agent, or Firm—Foley & Lardner

(57) ABSTRACT

The invention relates to a device for transporting objects in a vehicle. The device consists of an essentially trough-shaped holding container. The aim of the invention is to make the device more secure and more user-friendly. To this end, the holding container consists of a frame-type fixing part which can be fixed inside the vehicle, and at least one part-container which can be removed from the fixing part to form an access opening in the area of a part for accommodating a spare wheel on the vehicle side.

10 Claims, 5 Drawing Sheets

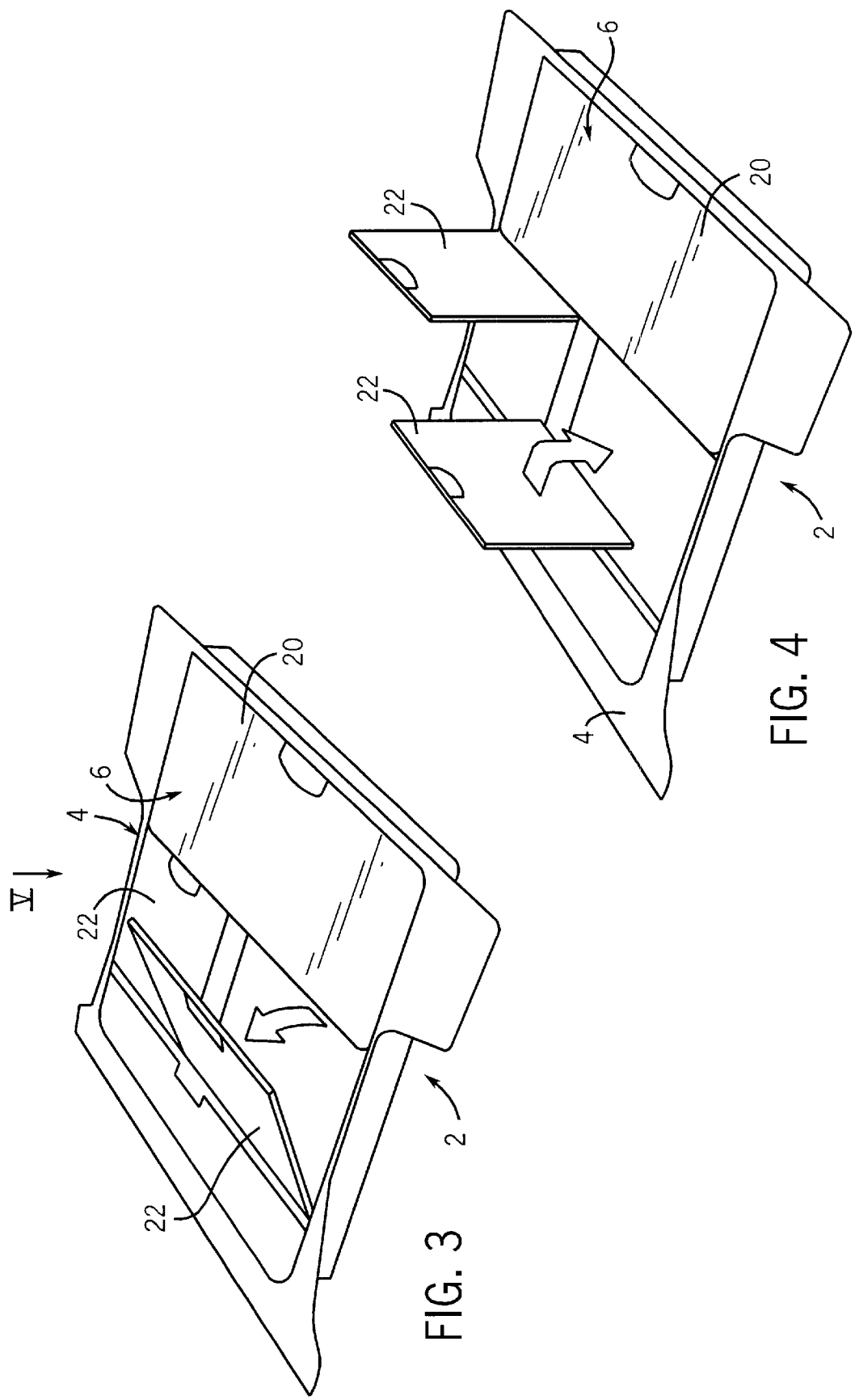

DEVICE FOR TRANSPORTING OBJECTS IN A MOTOR VEHICLE

The invention concerns a device for transporting objects in a motor vehicle consisting of an essentially trough-shaped carrier container.

Transportation troughs such as these are known, can be used in luggage compartments in motor vehicles such as, for example, station wagons. A disadvantage is that luggage pieces or other objects to be transported are essentially not fixed in the transportation trough and can therefore slide uncontrollably during travel. Also, the non-fixed arrangement of the transportation trough itself can lead to endangerment of the persons traveling in the motor vehicle. In addition, in most passenger vehicles, a spare wheel is accommodated in a contoured holder in the area of the luggage compartment, so that for removal, the entire transportation trough including all the objects contained therein have to be taken out.

The object of the invention is therefore to provide a transportation device of the type described above which ensures increased safety for the passengers of the motor vehicle as well as increased utilization comfort.

According to the invention, this is achieved in that the carrier container includes a frame-like holder that can be attached in the motor vehicle and which has at least one container section that can be removed from the holder to create an access opening in the area of the floor where the spare wheel holder is located.

Via the holder according to the invention, which can be attached in the motor vehicle, a high level of safety against slipping of the carrier container is obtained. However, the spare wheel compartment remains accessible to remove or replace a spare wheel, in that only the container section releasably installed in the holder can be removed. This means that either the container section is completely removable or it can at least be opened on the top in a hinged-lid fashion.

The carrier container according to the invention is adapted with respect to its outer frame shape to the spatial configuration of the motor vehicle. It is advantageous that the holder can be attached to mounting assemblies in the motor vehicle that are also suitable for attaching seating. Expressed inversely, this means that, after dismounting and removing the seating construction, the carrier container according to the invention or its holder can be attached on the seating mounting assemblies. For this purpose, the mounting assemblies are shaped, for example, as screw points (threaded holes) on which the holding part can be attached by screwing.

The carrier container according to the invention can have still more advantageous embodiment features, which primarily serve to ensure safety against slipping or other uncontrolled movements of the transported object. It is advantageous, therefore, that the container sections have preferably other holding compartments provided with at least one cover element each. In addition, partition wall elements can be provided, which can be removable and can be used selectively at different locations. Furthermore, it is advantageous that at least one of the cover elements can be fixed from its normal cover position into an arrangement which is essentially vertical to the container plane to form a partition or loading retaining wall.

Other advantageous embodiment features of the invention are contained in the dependent claims as well as in the following description.

The invention will be further described in view of the preferred exemplary embodiments, wherein:

FIGS. 3 and 4 show further perspective representations of the carrier containers to illustrate other functions;

Figure 1:
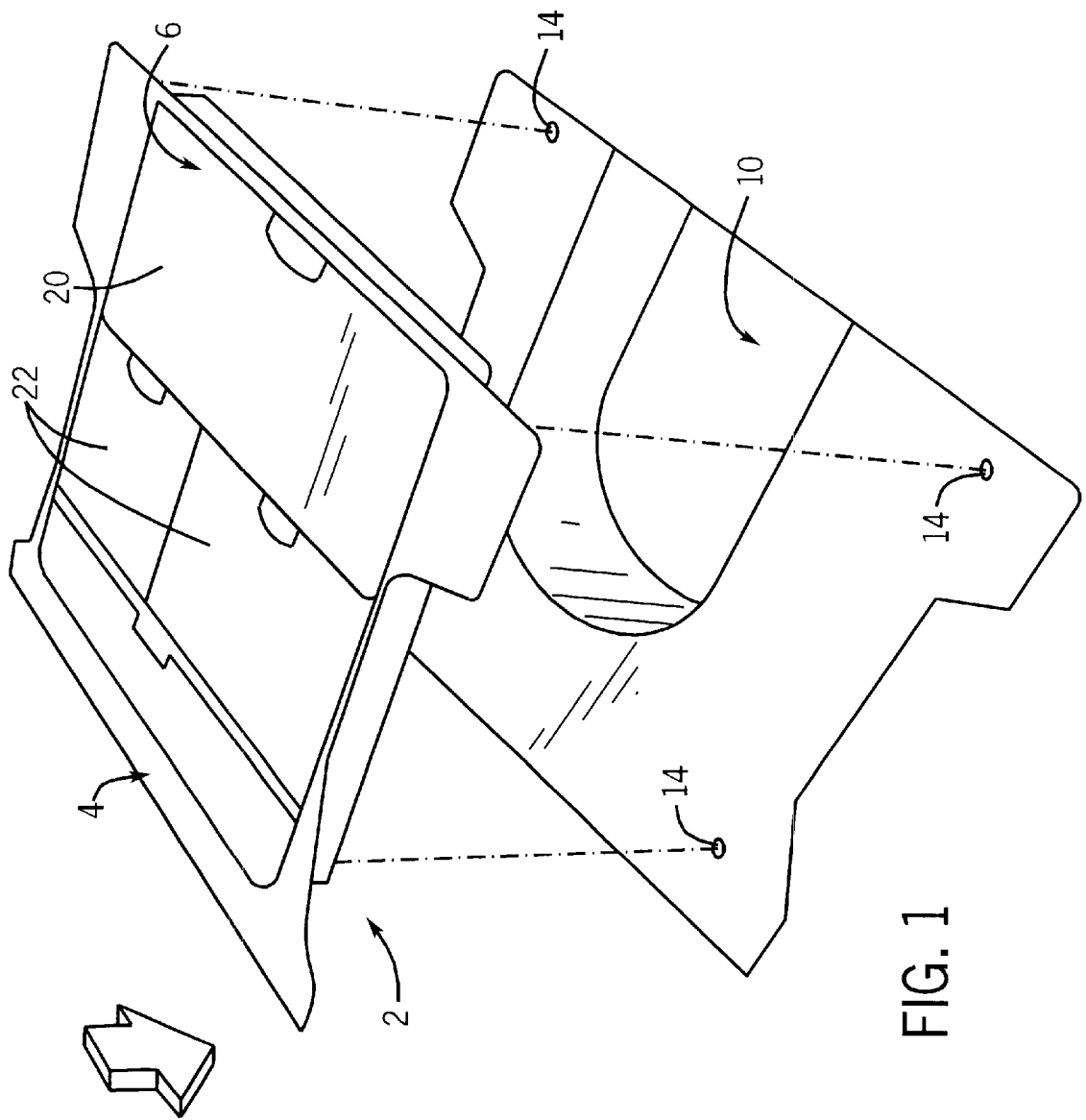
FIG. 1 shows a perspective view of a carrier container according to the invention during insertion relative to an only partially shown bottom area of a luggage compartment of a motor vehicle.

As a device for transporting objects in a motor vehicle is provided an essentially trough-shaped carrier container 2, which according to the invention consists of a frame-like holder 4 releasably attached to the motor vehicle and at least one container section 6 connected thereto. According to the invention, the container section 6 resides within access opening 8—see FIG. 2—which can be taken out of the holder 4. The access opening 8, which is adapted to the respective vehicle, is arranged in such a way that it covers a side spare wheel holder 10 (see FIGS. 1 and 6) with a specific opening width in such way that a spare wheel 12 (which can only be seen in FIG. 6) can be removed and replaced through the access opening 8.

As shown schematically in FIG. 1, the holder 4 can be attached to mounting assemblies 14 on the floor of the motor vehicle, while these mounting assemblies 14 are also preferably for attaching a seating construction (not shown). The arrangement of the mounting assemblies 14 corresponds to the requirements of each seating construction, and the carrier container 2 according to the invention is especially adapted thereto. The mounting assemblies 14 are purposefully formed by screw points or threaded holes, while the holder 4 can be attached via screws, which are not shown.

Figure 6:
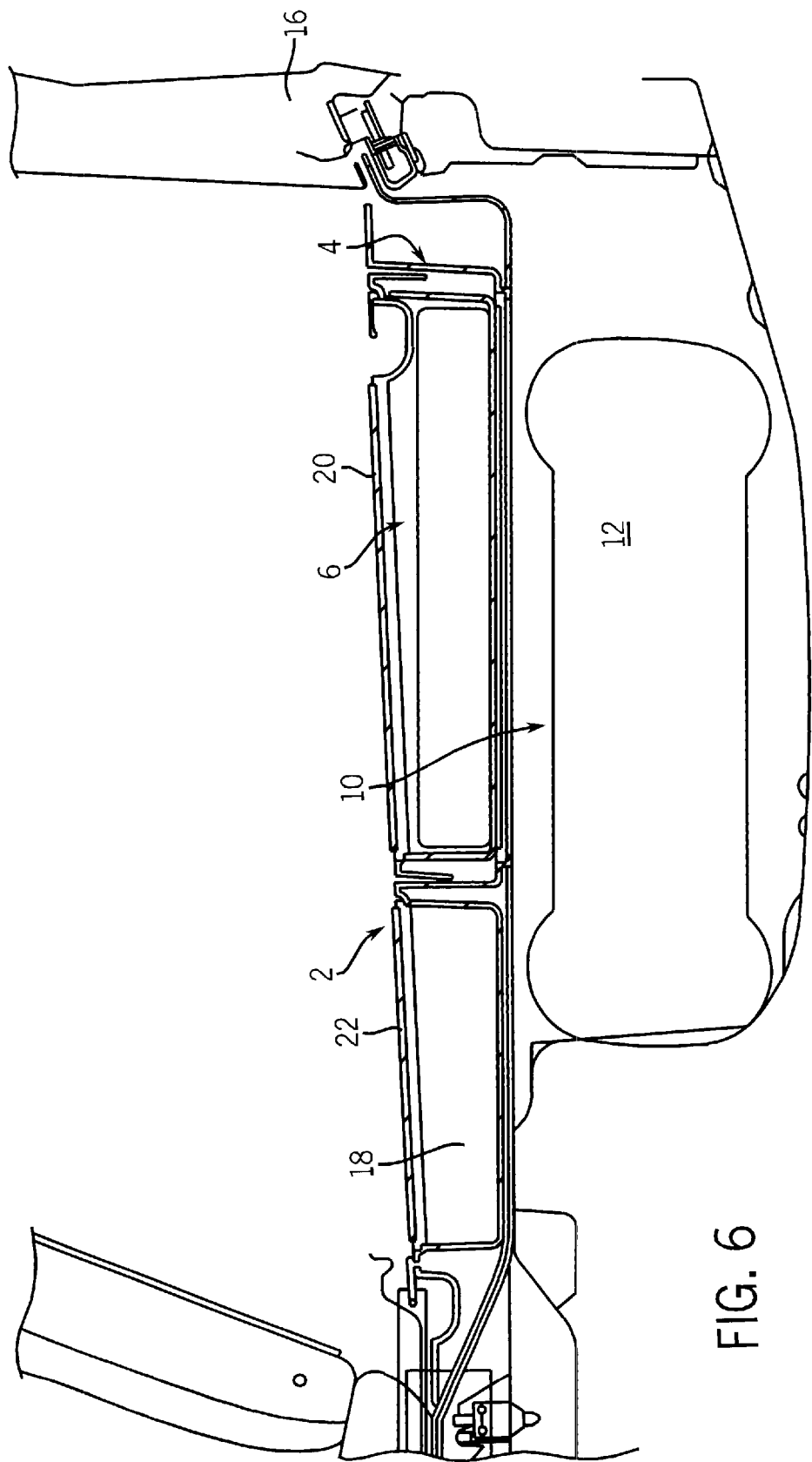
FIG. 6 shows an enlarged vertical section in the plane VI—VI according to FIG. 5.

As results from FIG. 6, the spare wheel 12 is usually arranged in the holder 10 in the rear area of the motor vehicle facing a rear door 16. Therefore, the container section 6 in the installed condition of the carrier container 2 is arranged in the rear area of the motor vehicle seen from the traveling direction. Preferably, therefore, the carrier container 2 has in its front area seen from the traveling direction at least one other holder compartment 18 which is preferably formed by the one-piece trough-like shaping of the holder 4.

Figure 5:
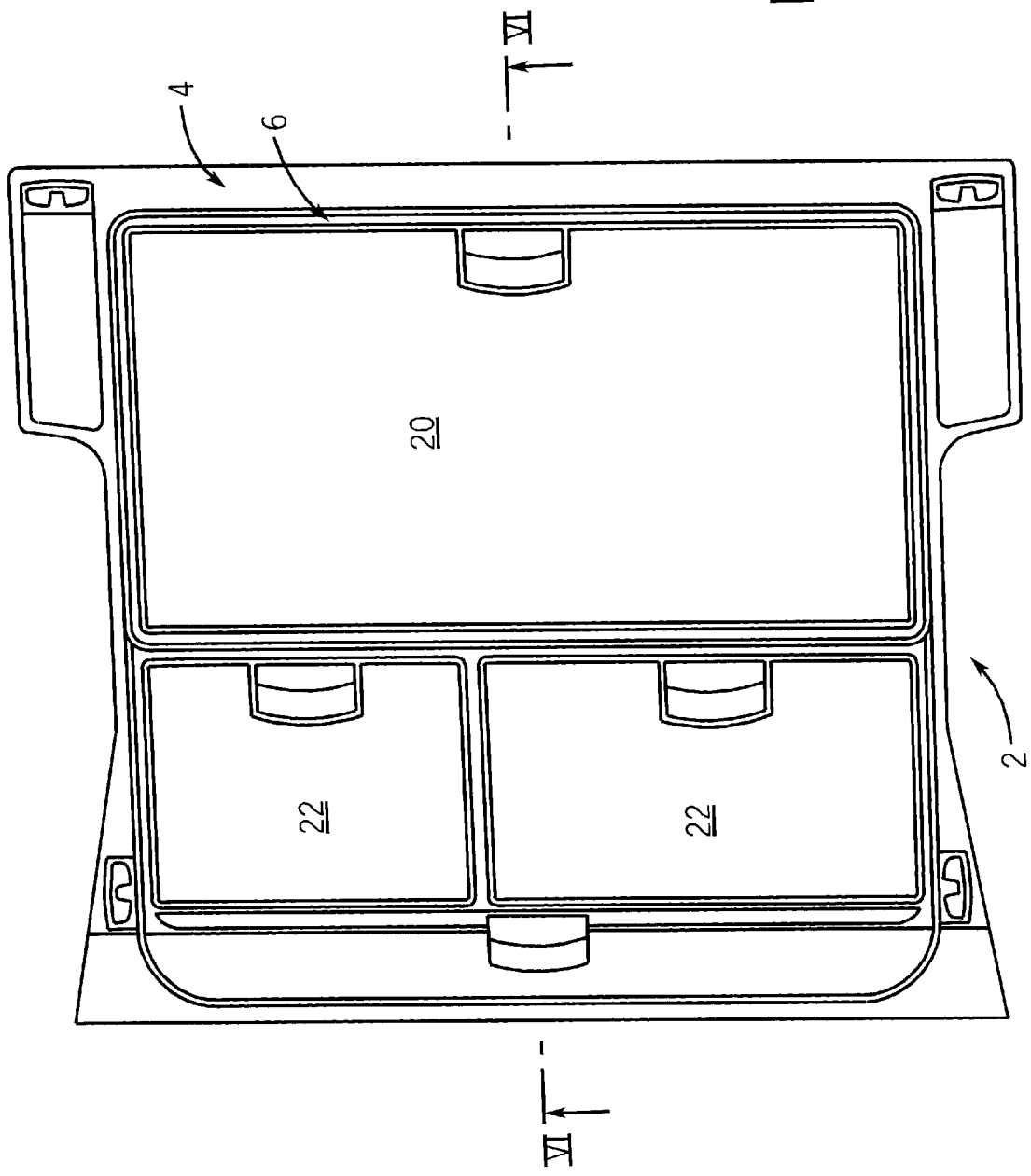
FIG. 5 shows an enlarged plan view in the direction of the arrow V of FIG. 3.

For closing the container section 6 and/or one or each holder compartment 18 is provided at least one cover element 20, 22. The container section 6 has its own cover element 20 which corresponds thereto in size, which can be removed together with the container section 6 according to FIG. 2. In the area of the holder compartment 18 can be provided—as shown—two separate cover elements 22, which can be configured according to FIG. 5 in different sizes. According to FIG. 4, it is preferred that at least one of these cover elements 22 be moved from its normal cover position (FIGS. 1, 2, and 3) into an arrangement which is essentially vertical to the container plane (see FIG. 4) so as to form a partition wall or loading retention wall. For this purpose, the cover element 22 is preferably releasable from the carrier container 2 or from the holder 4 and is then insertable into the vertical arrangement with its side edges in side guides in the area of the holder compartments 18. This is shown by means of an arrow in FIG. 4.

Figure 2:
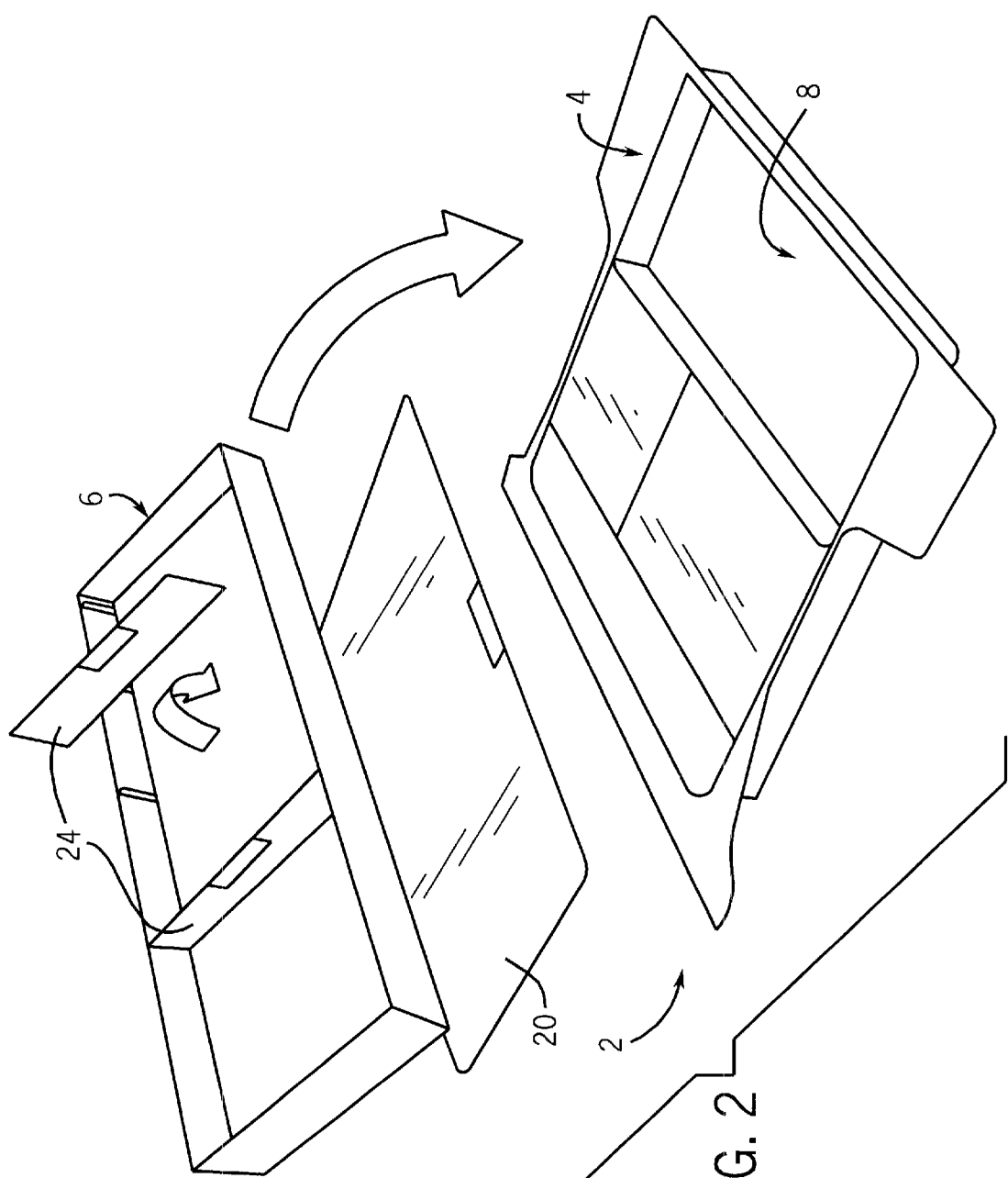
FIG. 2 shows the carrier container of FIG. 1, illustrating the removability or insertability of the container section relative to the holder which can be attached to the motor vehicle.

To further secure transported goods against slipping, it is preferred to provide at least one partition wall element 24, which according to FIG. 2 is preferably releasable and selectively insertable at different points into the container section 6 and/or into the holder compartment.

In another advantageous embodiment, the carrier container 2 can have holding means (not shown) for the purpose of, for example, a net-like luggage compartment separation. Furthermore, also special holding means for specific objects can be advantageously provided, for example, for a bicycle or the like.

Another safety aspect consists in the carrier container 2 being designed with respect to the shape and size of the inner space of the container section 6 or the holder compartment 18 in such way that a predetermined quantity of similar inserts can be fixedly accommodated without play and therefore without slipping. Such inserts can be, for example, beverage boxes, stackable boxes, or the like. This means that the base of the container section 6 or the holder compartment 18 corresponds essentially to a surface which results from the bases of a specific number of inserts standing directly one beside and/or behind the other.

It should be mentioned additionally that the carrier container 2 according to the invention with its individual parts consists preferably of plastic (plastic molded parts). On the upper sides can be advantageously arranged a coating, in particular, a carpet material.

The container section 6 can be fixed in its condition inserted into the holder 4, for example, via stop means. In a similar way, the cover elements 20, 22 can be fixed in their closed position.

The invention is not limited to the shown and described exemplary embodiments, but also comprises all the embodiments which are equally effective in the sense of the invention. Furthermore, the invention is also not limited to the feature combination defined in claim 1, but can also be defined by any desired other combination of specific features of all the overall disclosed individual features. This means that basically practically each individual feature of claim 1 can be eliminated or substituted with at least one other individual feature described in another part of the disclosure. Claim 1 is to be understood as a first formulation of the invention.

What is claimed is:

1. A trough-shaped device for transporting objects in a motor vehicle, comprising:

a frame-like holder, which can be attached in the motor vehicle wherein the holder is securely attached to a plurality of seating mounting assemblies; and at least one container section, which is removable from the holder for forming an access opening in the area of a spare wheel holder on the floor of the vehicle.

2. The device according to claim 1, wherein the mounting assemblies are formed by screw points at which the holder can be attached via screwing.

3. A trough-shaped device for transporting objects in a motor vehicle, comprising:

a frame-like holder, which can be attached in the motor vehicle; and at least one container section, which is removable from the holder for forming an access opening in the area of a spare wheel holder on the floor of the vehicle, wherein the access opening is configured to allow a spare wheel to be guided through the access opening.

4. The device according to claim 3, wherein the container section is arranged in a rear area of the motor vehicle.

5. The device according to claim 3, wherein the frame-like holder has a front area having at least one other holder compartment.

6. The device according to claim 5, wherein the container section or the at least one other holder compartment can be closed with at least one cover element.

7. The device according to claim 5, wherein the container section or the holder compartment has at least one partition wall element which is releasable and selectively insertable at different points.

8. The device according to claim 6, wherein at least one of the cover elements is moveable from its cover position into an arrangement which is essentially vertical to the container plane.

9. The device according to claim 8, wherein the cover element can be released from the carrier container and can be inserted into the vertical arrangement with its side edges into side guides.

10. The device according to one of claim 5, wherein the container section or the other holder compartment is configured to accommodate a plurality of similar inserts.

* * * * *